J. T. GENTRY.
CAR AXLE ANCHOR.
APPLICATION FILED JUNE 22, 1921.

1,429,582.

Patented Sept. 19, 1922.

Inventor:
Jesse T. Gentry,
by Byrnes Townsend & Brickenstein, Attorneys.

Patented Sept. 19, 1922.

1,429,582

UNITED STATES PATENT OFFICE.

JESSE T. GENTRY, OF LEBANON JUNCTION, KENTUCKY.

CAR-AXLE ANCHOR.

Application filed June 22, 1921. Serial No. 479,601.

*To all whom it may concern:*

Be it known that I, JESSE T. GENTRY, a citizen of the United States, residing at Lebanon Junction, in the county of Bullitt and State of Kentucky, have invented certain new and useful Improvements in Car-Axle Anchors, of which the following is a specification.

This invention relates to car axle anchors and particularly to an anchor for holding a car axle in fixed position during repairs to the journal-box.

In replacing a worn or defective bearing brass in a journal-box it is first necessary to jack up the journal-box. If no provision is made for holding the car axle in position, the weight upon the opposite journal of the same axle will usually tilt the axle upwardly as fast as the journal-box is raised. When this occurs the car axle must be pried down before the brasses can be removed, but it is often difficult and at times impossible to force down the car axle in this manner. Although devices for holding down a car axle during these repairs are old, so far as I am aware such prior devices are defective in operation and fail to accomplish the purpose for which they were designed.

An object of my invention is to provide an improved form of flexible anchoring device for holding car axles during journal-box repairs. A further object of the invention is to provide a flexible anchor of the type described which when applied will hold the car axle and wheel securely in place as the journal-box is jacked up. More specifically an object of my invention is to provide a flexible member of the type described having provision for adjusting the length of said member and having anchoring devices for attaching said member to the base of the rail on which the car rests.

Figure 1:
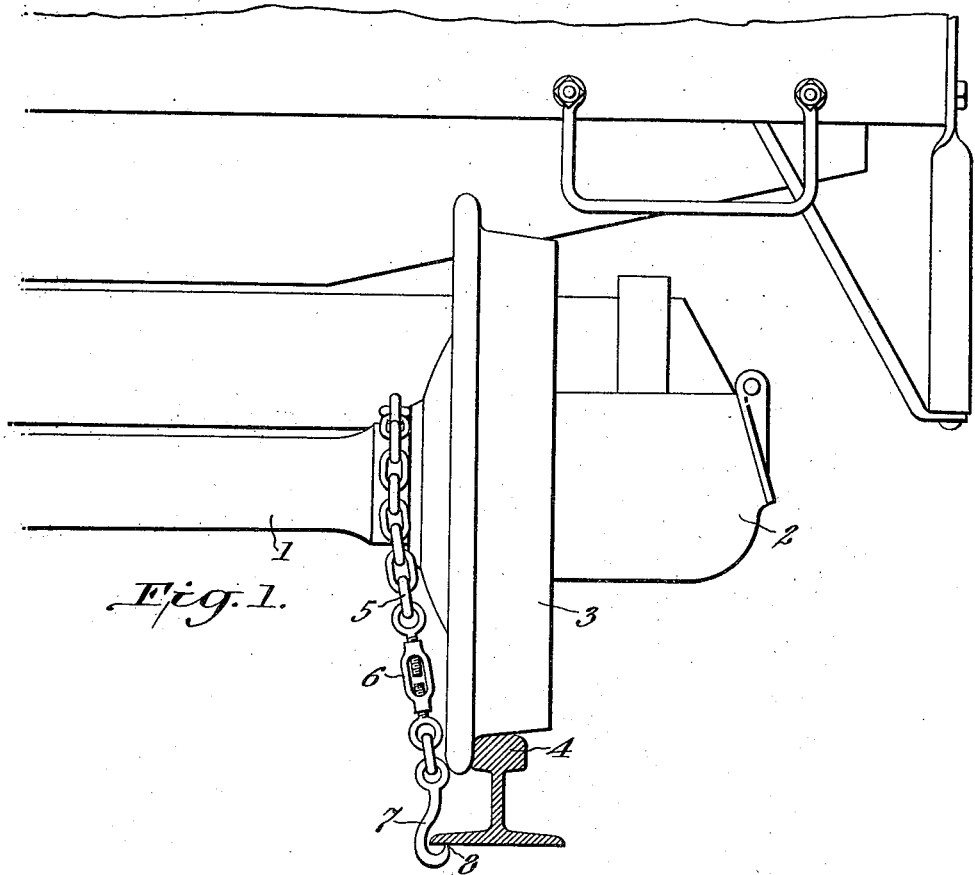
Figure 2:
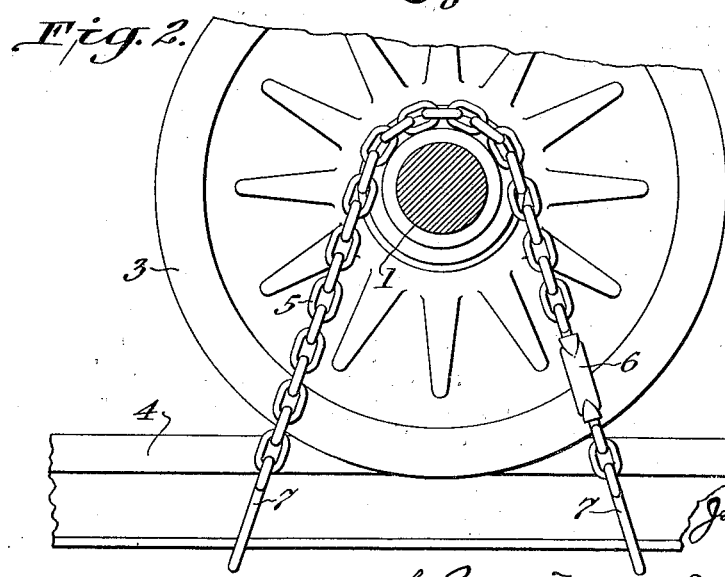

An embodiment of my invention is illustrated in the accompanying drawings in which Fig. 1 is an end elevation of a portion of a car axle and associated parts and showing my form of axle anchor applied thereto, and Fig. 2 is a vertical section through the car axle looking towards the axle anchor.

In the drawings, numeral 1 indicates a car axle mounted in a journal-box 2 and carrying a wheel 3 which rests on the rail 4. My improved anchoring device for holding the axle 1 in place when the journal-box 2 is jacked up comprises the chain 5 which is provided with a turnbuckle 6 near one end of the chain and with anchoring hooks 7, 7. Hooks 7 are formed of hard steel and are provided with non-slipping means for engaging the lower face of the rail, as sharp points 8. The hooks 7 have such a shape and are so designed that when tension is applied at the eye of the hook the point 8 will be held firmly against the base of the rail.

When it is necessary to repair a journal-box the chain 5 is passed over the axle 1 and the points 8 of hooks 7 are engaged under the flange of the rail 4 at the inner side thereof. To prevent a side pull on the axle the hooks 7, 7 should be spaced equidistant from the point of the rail on which the wheel rests. The turnbuckle 6 provides means for adjusting the length of the chain so that ties or other permanent parts of the roadbed may be cleared to secure this result. When the chain 5 is in position, the slack in the chain is taken up by means of the turnbuckle 6. With the chain 5 drawn taut the two falls of the anchoring device are straight and lie substantially in a plane since the chain is connected to the rail 4 near its inner edge. By this arrangement of the anchoring device no upward movement of the axle is possible during the upward movement of the journal-box.

An anchoring device constructed as described is strong, light and of little bulk. As the brake-rigging, truck frame, etc., do not interfere with the use of the device it can be readily applied and removed by one man. When applied the turnbuckle is opposite the dished part of the wheel and may therefore be easily adjusted.

In actual use it has been shown that the device is very efficient in operation and that it reduces materially the time necessary for repairs to journal-boxes.

It is to be understood that the specific embodiment herein described is merely illustrative of my invention and that various changes in the elements, their relative size, shape and location may be made without departing from the scope of my invention.

I claim:—

1. An anchoring device for use with a car axle comprising a flexible member, means for adjusting the length of the member and means for connecting the flexible member to a rail flange at the inner side thereof so that the flexible member extends in straight lines from the car axle to the points where attached to the rail.

2. An anchoring device as claimed in claim 1 in which the means for connecting the flexible member to the rail comprises hooks adapted to engage the lower face of the rail.

3. An axle anchor comprising a flexible member, means for adjusting the length of said member and a hook at each end of said member having a non-slipping portion adapted to engage the lower face of a rail.

In testimony whereof, I affix my signature.

JESSE T. GENTRY.